(12) United States Patent
Glover et al.

(10) Patent No.: US 9,985,465 B1
(45) Date of Patent: May 29, 2018

(54) SYSTEMS, DEVICES, AND/OR METHODS FOR MANAGING ELECTRICAL ENERGY

(71) Applicants: Ahmad L. D. Glover, Smithfield, VA (US); Cherif Chibane, Tewksbury, MA (US)

(72) Inventors: Ahmad L. D. Glover, Smithfield, VA (US); Cherif Chibane, Tewksbury, MA (US)

(*) Notice: Subject to any disclaimer, the term of this patent is extended or adjusted under 35 U.S.C. 154(b) by 12 days.

(21) Appl. No.: 15/640,574

(22) Filed: Jul. 2, 2017

Related U.S. Application Data

(60) Provisional application No. 62/506,737, filed on May 16, 2017.

(51) Int. Cl.
*H04W 24/00* (2009.01)
*H02J 7/02* (2016.01)
*H04W 64/00* (2009.01)
*H02J 50/20* (2016.01)
*H04W 84/18* (2009.01)

(52) U.S. Cl.
CPC ........... *H02J 7/025* (2013.01); *H02J 50/20* (2016.02); *H04W 64/00* (2013.01); *H04W 84/18* (2013.01)

(58) Field of Classification Search
CPC .................................................. H02J 7/025
USPC ........................................................ 455/456.1
See application file for complete search history.

(56) References Cited

U.S. PATENT DOCUMENTS

| | | |
|---|---|---|
| 3,887,739 A | 6/1975 | Kromrey |
| 5,114,834 A | 5/1992 | Nachshon |
| 5,982,139 A | 11/1999 | Parise |
| 3,124,125 A1 | 9/2015 | Leabman et al. |
| 2004/0142733 A1* | 7/2004 | Parise .................. B01F 5/0614 455/572 |
| 2015/0042265 A1 | 2/2015 | Leabman et al. |

* cited by examiner

*Primary Examiner* — Joel Ajayi
(74) *Attorney, Agent, or Firm* — Dale Jensen

(57) ABSTRACT

Certain exemplary embodiments can provide a system, which comprises a multi point power charger. The multi point power charger is coupleable to an electrical energy source. The multi point power charger constructed to emit a plurality of directional beams. Each of the plurality of directional beams is directable toward a determined direction of an electronic device that is chargeable via the multi point power charger.

15 Claims, 12 Drawing Sheets

SYSTEMS, DEVICES, AND/OR METHODS FOR MANAGING ELECTRICAL ENERGY

CROSS-REFERENCES TO RELATED APPLICATIONS

This application claims priority to, and incorporates by reference herein in its entirety, U.S. Provisional Patent Application Ser. No. 62/506,737, filed May 16, 2017.

BRIEF DESCRIPTION OF THE DRAWINGS

A wide variety of potential practical and useful embodiments will be more readily understood through the following detailed description of certain exemplary embodiments, with reference to the accompanying exemplary drawings in which.

DETAILED DESCRIPTION

Certain exemplary embodiments can provide a system, which comprises a multi point power charger. The multi point power charger is coupleable to an electrical energy source. The multi point power charger constructed to emit a plurality of directional beams. Each of the plurality of directional beams is directable toward a determined direction of an electronic device that is chargeable via the multi point power charger.

Certain exemplary embodiments provide an adaptable multi point power charger, which utilizes a smart antenna and is coupleable to an ad hoc network. The multi point power charger adaptively directs power to charge remote devices. The multi point power charger is relatively efficient and reduces ambient radio frequency ("RF") power to provide low interference.

Figure 1:
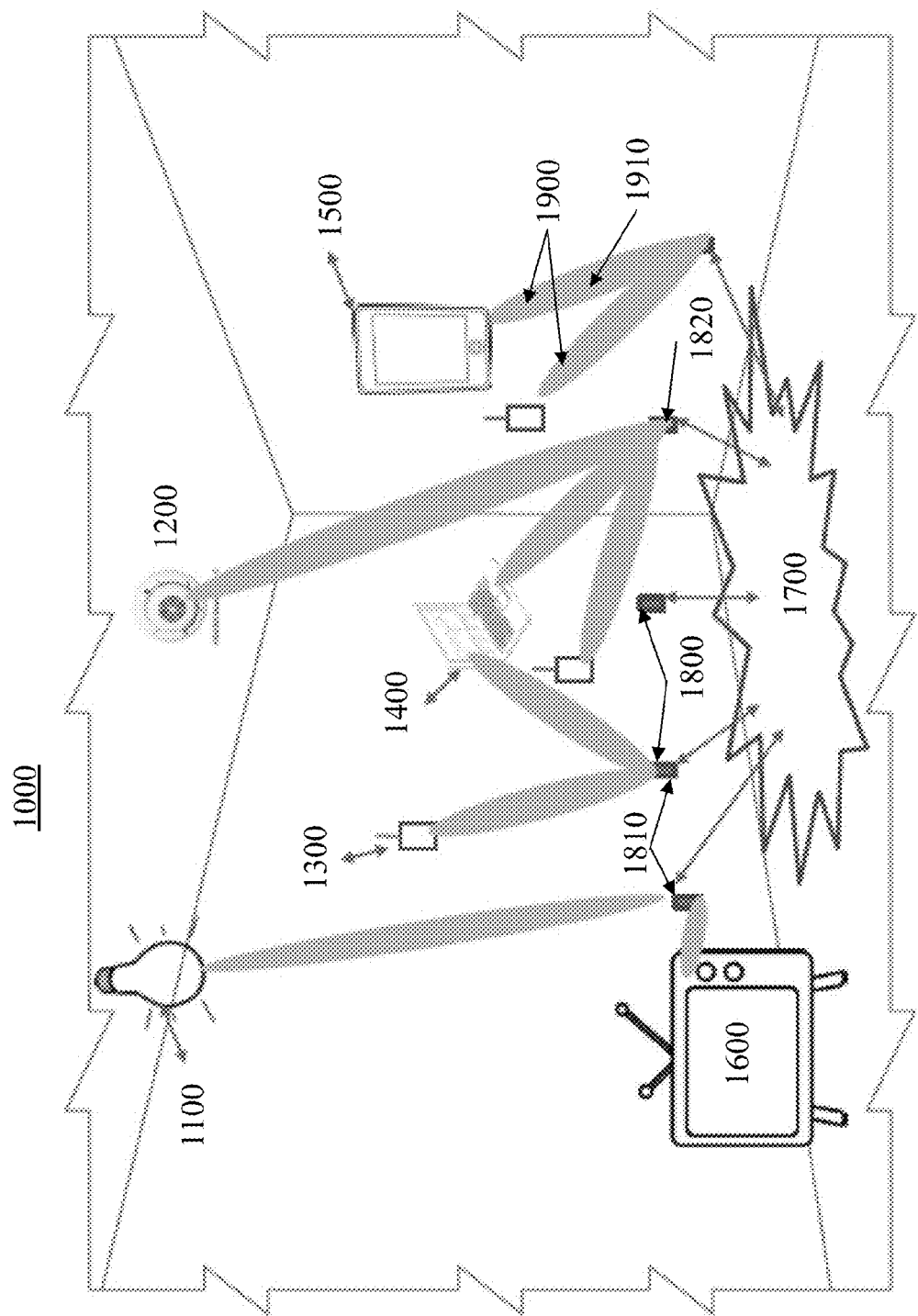
FIG. 1 is a block diagram of an exemplary embodiment of a system 1000.

FIG. 1 is a block diagram of an exemplary embodiment of a system 1000. A plurality of multi point power chargers 1800 can be electrically coupled to electrical energy sources 1810 (e.g., electrical outlets as illustrated). Plurality of multi point power chargers 1800 can be electrically and/or communicatively coupled to devices (e.g., to a handheld device 1500, home security system 1200, relatively high power un-tethered devices 1400, electronic device 1300 (which can be one of a plurality of relatively low power un-tethered devices), a light fixture 1100, and/or a TV/home gateway 1600, etc. as illustrated).

Multi point power chargers 1800 can mount and/or be coupled to electrical energy sources 1810 and generate directional beams 1900 (which directional beams provide power to system devices) directed to one or more devices that are chargeable. Multi point power chargers 1800 can be communicatively coupled to a local area network ("LAN") 1700 to communicate information concerning one or more of:
- identify one or more devices in need of charging;
- location information concerning one or more devices; and/or
- a selection of a charge controller to charge one or more identified devices.

One or more identified devices can request charging from multi point power chargers 1800. A directional beam of directional beams 1900 can be assigned to the device requesting a charge to begin charging. Certain exemplary embodiments update device locations as devices move. Thereby, selected multi point power chargers 1800 providing recharging can be changed based upon movement of a given rechargeable device. Power transmitted via RF can be dynamically adjusted based upon device location and charging need.

Multi point power chargers 1800 generate directed beams of power to target a device that needs and/or requests charging. Multi point power chargers 1800 can be communicatively coupled to LAN 1700 to communicate information such as:
- each device that requests charging is assigned a number and becomes a node of the network;
- each device that requests charging can elect to request to be charged or not;
- what devices need to be charged;
- where each device to located and/or
- which of multi point power chargers 1800 charge which device; etc.

Mobile devices are communicatively coupled to LAN 1700. If a mobile device needs and/or requests charging, the mobile device sends a request via LAN 1700. A directional beam is assigned to the mobile device and charging starts. Locations of devices are repeatedly updated.

A system 1000 comprises a multi point power charger 1820, which is one of plurality of multi point power chargers 1800. Multi point power charger 1820 is coupleable to an electrical energy source 1810. Multi point power charger 1820 is constructed to emit a plurality of directional beams 1900. Wherein each of plurality of directional beams 1900 is directable toward a determined direction of an electronic device 1300. Multi point power charger 1820 is constructed to wirelessly charge or power electronic device 1300. Multi point power charger 1820 can comprise:
- a converter (see e.g., converter 3200 of FIG. 3) that is constructed to convert electrical energy having an alternating current or direct current, such as from solar energy sources, into wireless electrical energy;
- a base band processor (see e.g., base band processor 3300 of FIG. 3);
- a RF processor (see e.g., RF processor 3400 of FIG. 3);
- a multidirectional antenna array (see e.g., multidirectional antenna array 3600 of FIG. 3), the multidirectional antenna array constructed to emit substantially wireless directional beams 1900 that are at least one of:
  - directed in any of a plurality of directions; and transmitted substantially wirelessly via a locally available RF signal, RF signal comprising a RF charging beam 1910; and a system controller constructed to:
enable electronic device 1300 to be followed by the RF charging beam 1910 (which can be one of plurality of directional beams 1900) responsive to motion of electronic device 1300; and allow for a formation of an AdHoc and repeatedly calculates a position of electronic device 1300 so as to redirect the RF charging beam (i.e., one of plurality of directional beams 1900).

Multi point power charger 1820 is constructed to:

determine a location of electronic device 1300;

direct one of plurality of directional beams 1900 toward the determined location of electronic device 1300 to charge or power electronic device 1300;

provide plurality of directional beams 1900 via radio frequency into a general location, whereby electronic device 1300 is charged when in a range within which multi point power charger 1820 can cause a self-charge or recharge;

provide a plurality of wireless electrical power radio frequency transmissions (i.e., plurality of directional beams 1900) into a general location, wherein electronic device 1300 is charged when in a range within which multi point power charger 1820 can cause a self-charge or recharge;

provide electrical energy wirelessly to any detected device (e.g., electronic device 1300) that requests electrical energy;

automatically update the location of electronic device 1300; and/or redirect one of plurality of directional beams 1900 toward the updated location of electronic device 1300, etc.

A signal can be received by the multi point power charger 1820 indicating:

that a charging request from electronic device 1300; and which of plurality of directional beams 1900 will be providing electrical energy to electronic device 1300.

Multi point power charger 1820 can be one of plurality of the multi point power chargers 1800. A signal can be received by multi point power charger 1820 indicating:

a charging request from electronic device 1300; and which of plurality of multi point power chargers 1820 will be providing electrical energy to electronic device 1300.

Multi point power charger 1820 can be dynamically selected from plurality of multi point chargers 1800 based upon a determined location of electronic device 1300.

Machine instructions (e.g., machine instructions 3900 of FIG. 3) that cause the electronic device 1300 to be charged via multi point power charger 1820.

Figure 2:
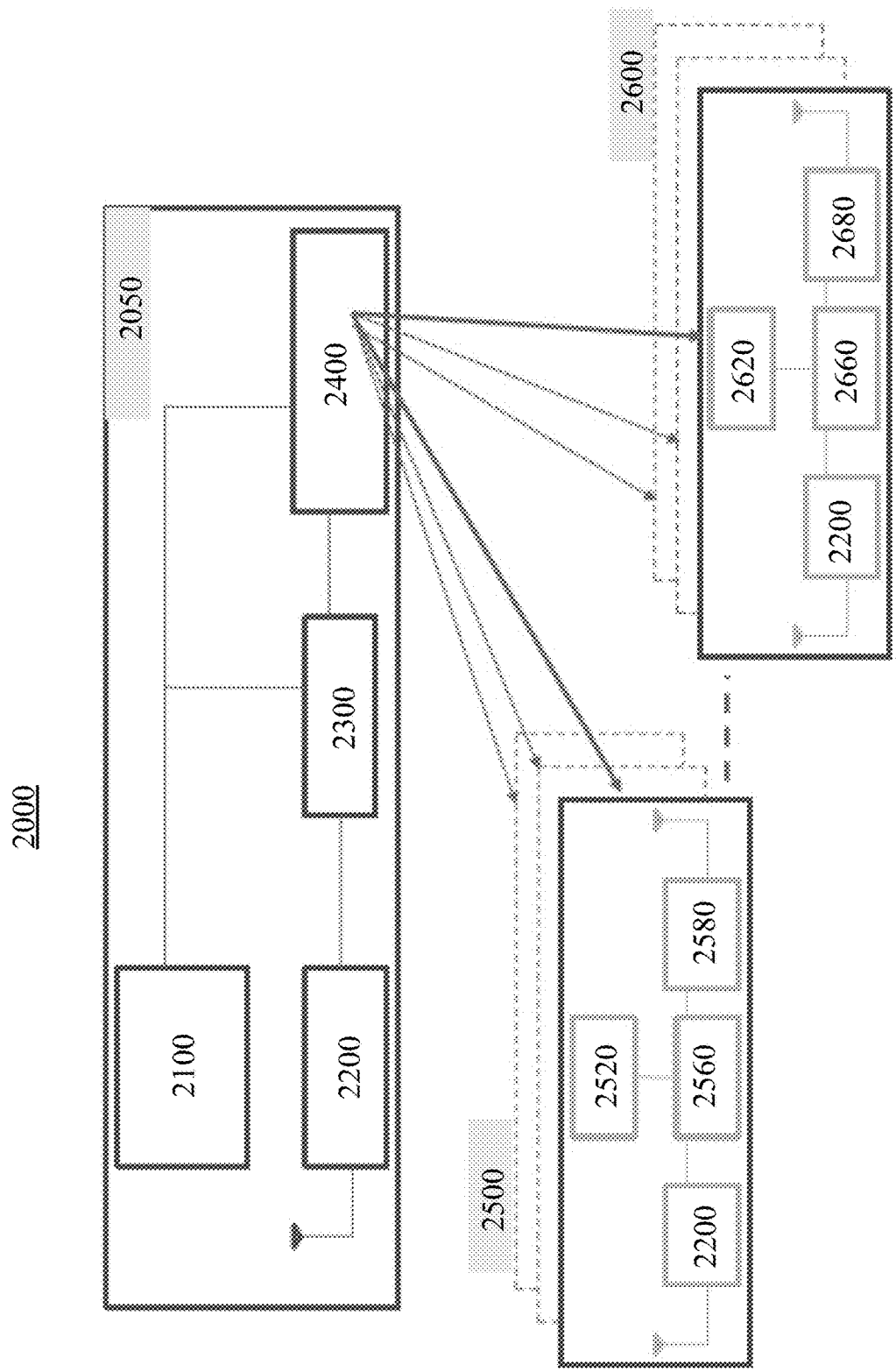
FIG. 2 is a block diagram of an exemplary embodiment of a system 2000.

FIG. 2 is a block diagram of an exemplary embodiment of a system 2000, which comprises a wall mounted multi point power charger 2050, mobile units 2500, and mobile units 2600. Multi point power charger 2050 comprises a wall alternating current ("AC") to direct current ("DC") converter 2100 and a controller 2300. Wall mounted unit is communicatively coupled to a LAN 2200 and is constructed to transmit multi-directional beams 2400. Mobile units 2500 comprise a battery charger 2520, a controller 2560, and a receiver 2580. Mobile units are communicatively coupled to LAN 2200. Mobile units 2600 comprise a battery charger 2620, a controller 2660, and a receiver 2680. Mobile units are communicatively coupled to LAN 2200.

A wall mount multi point power charger is augmented by a controller. The system provides RF beam forming capabilities, which RF beams are formed and directed via communications transmitted via a formed AdHoc network. When an untethered device (e.g., an electronic device) needs charging, it requests charging via a signal transmitted via the AdHoc network. A particular multi point power charger is selected by an information device coupled to the AdHoc network, which causes generation of a directed beam that is a radio frequency ("RF") beam. The information device determines the location of the untethered device and assigns a different beam if necessary. RF transmitted power is dynamically adjusted based the location and charging needs of the untethered device.

Figure 3:
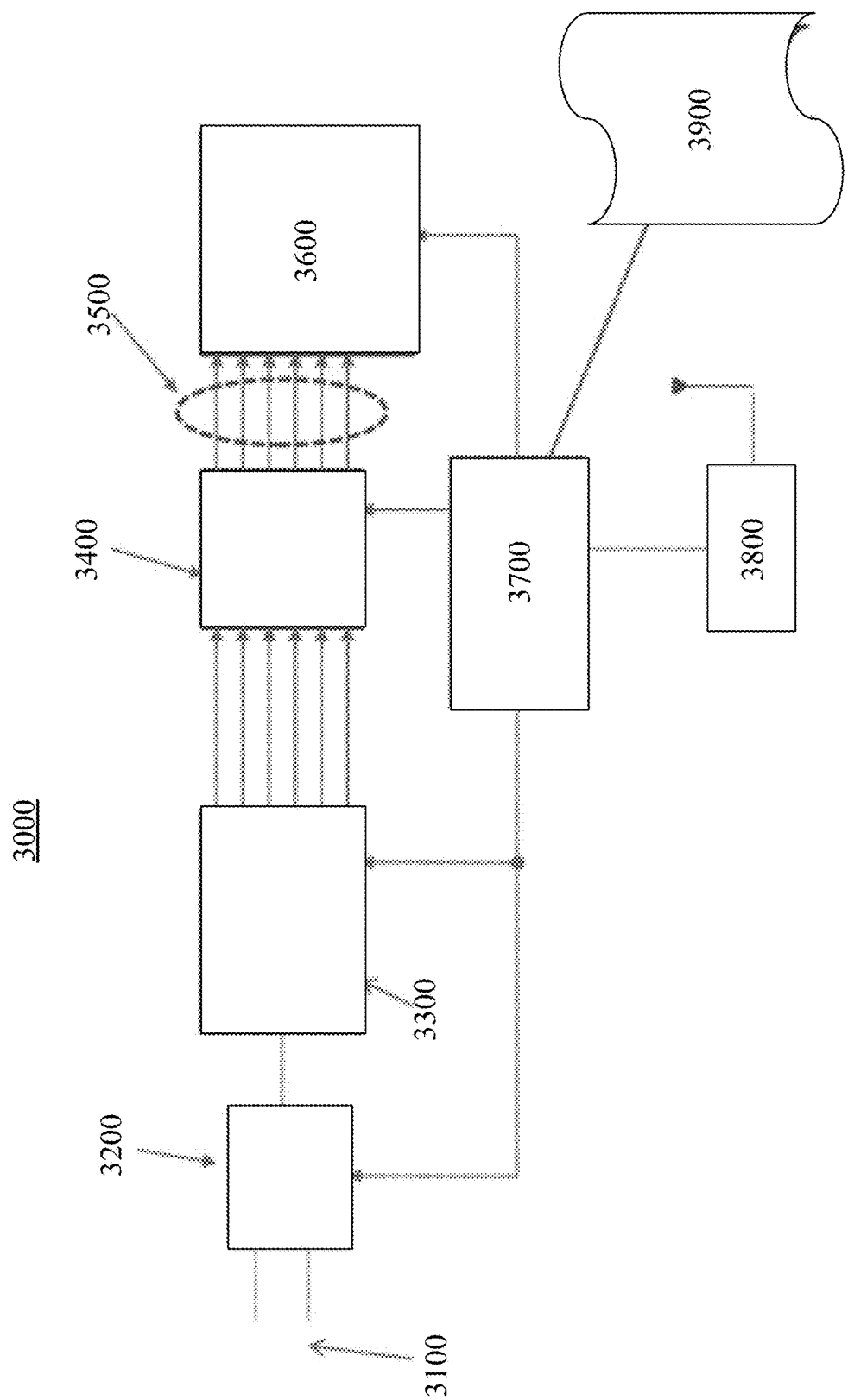
FIG. 3 is a block diagram of an exemplary embodiment of a system 3000.

FIG. 3 is a block diagram of an exemplary embodiment of a system 3000. AC power 3100 enters system 3000 and is converted to DC power via converter 3200. System 3000 comprises a base band processor 3300, an RF processor 3400, a beam formation control 3500, a multidirectional antenna array 3600, a system controller 3700, a LAN 3800, and machine instructions 3900.

Figure 4:
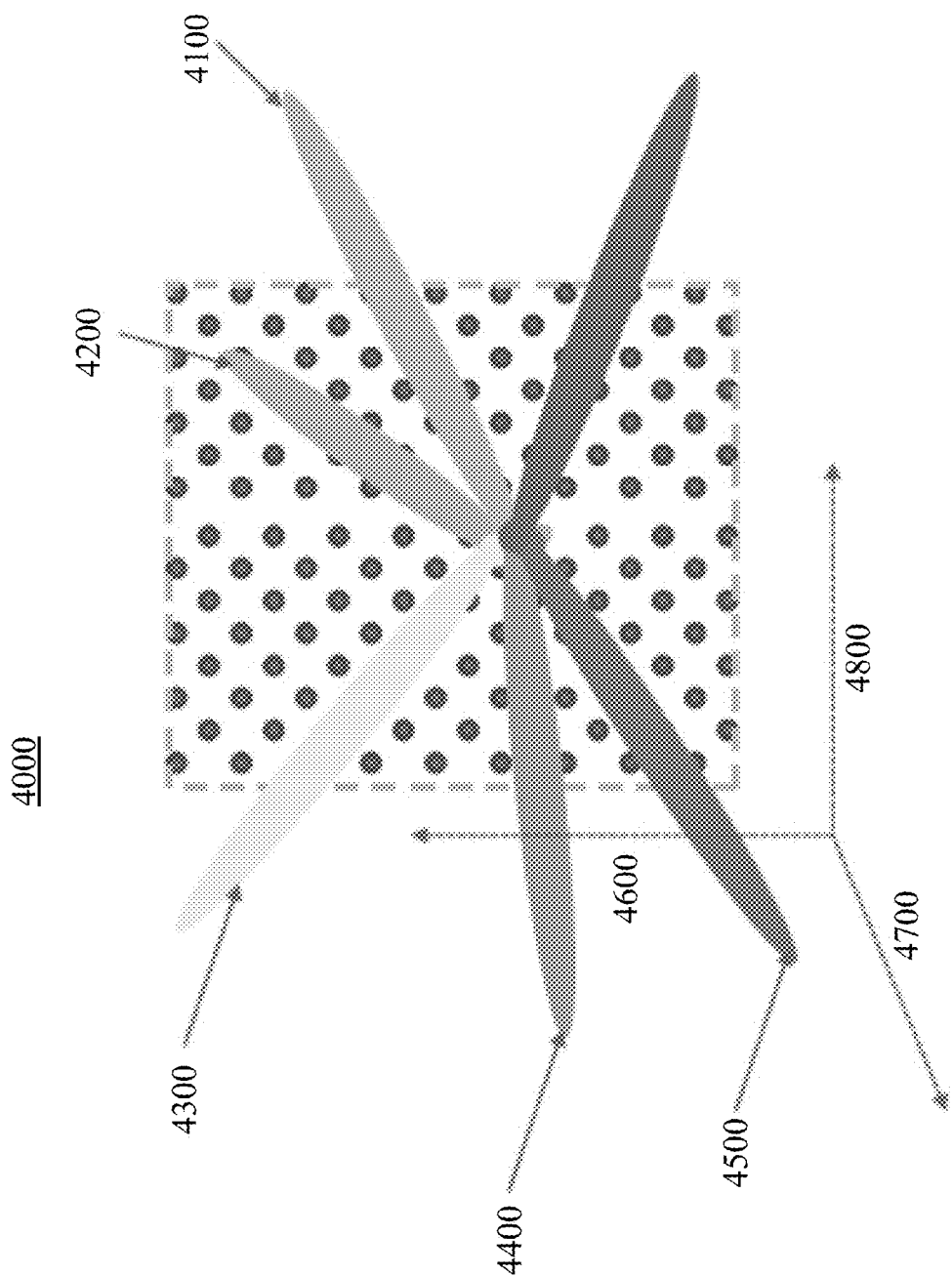
FIG. 4 is a block diagram of an exemplary embodiment of a multi directional antenna array 4000.

FIG. 4 is a block diagram of an exemplary embodiment of a multi directional antenna array 4000. RF Energy is directed to a mobile device on a transmit side. The system detects a presence of the mobile device and assigns a charging RF beam for it. Multi directional antenna array 4000 transmits a first charging beam 4100, a second charging beam 4200, a third charging beam 4300, a fourth charging beam 4400, and a fifth charging beam 4500. Each charging beam can be directed in three-dimensional space relative to an x-axis 4800, a y-axis 4600, and a z-axis 4700.

Figure 5:
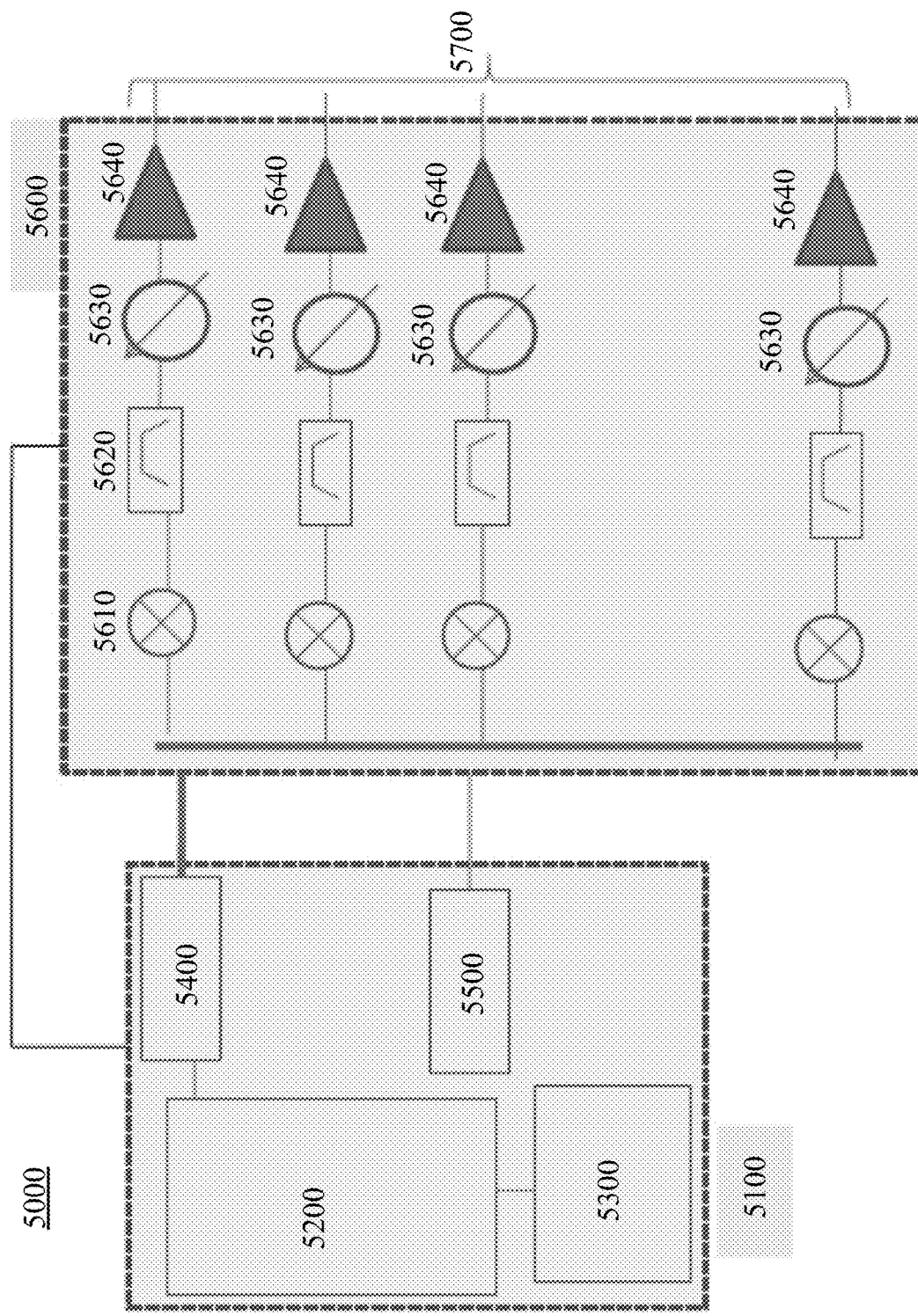
FIG. 5 is a block diagram of an exemplary embodiment of a wall mounted multi point power charger system 5000.

FIG. 5 is a block diagram of an exemplary embodiment of a wall mount multi point power charger system 5000, which comprises a baseband processor 5100 and an RF processor 5600. Baseband processor 5100 comprises a processor 5200, a controller 5300, modulators 5400, and beam control 5500. RF processor 5600 comprises a plurality of local oscillators 5610, a plurality of band pass filters 5620, a plurality of phase shifters 5630, and a plurality of power amplifiers 5640. An output 5700 from multi point power charger system 5000 flows to antenna elements.

Figure 6:
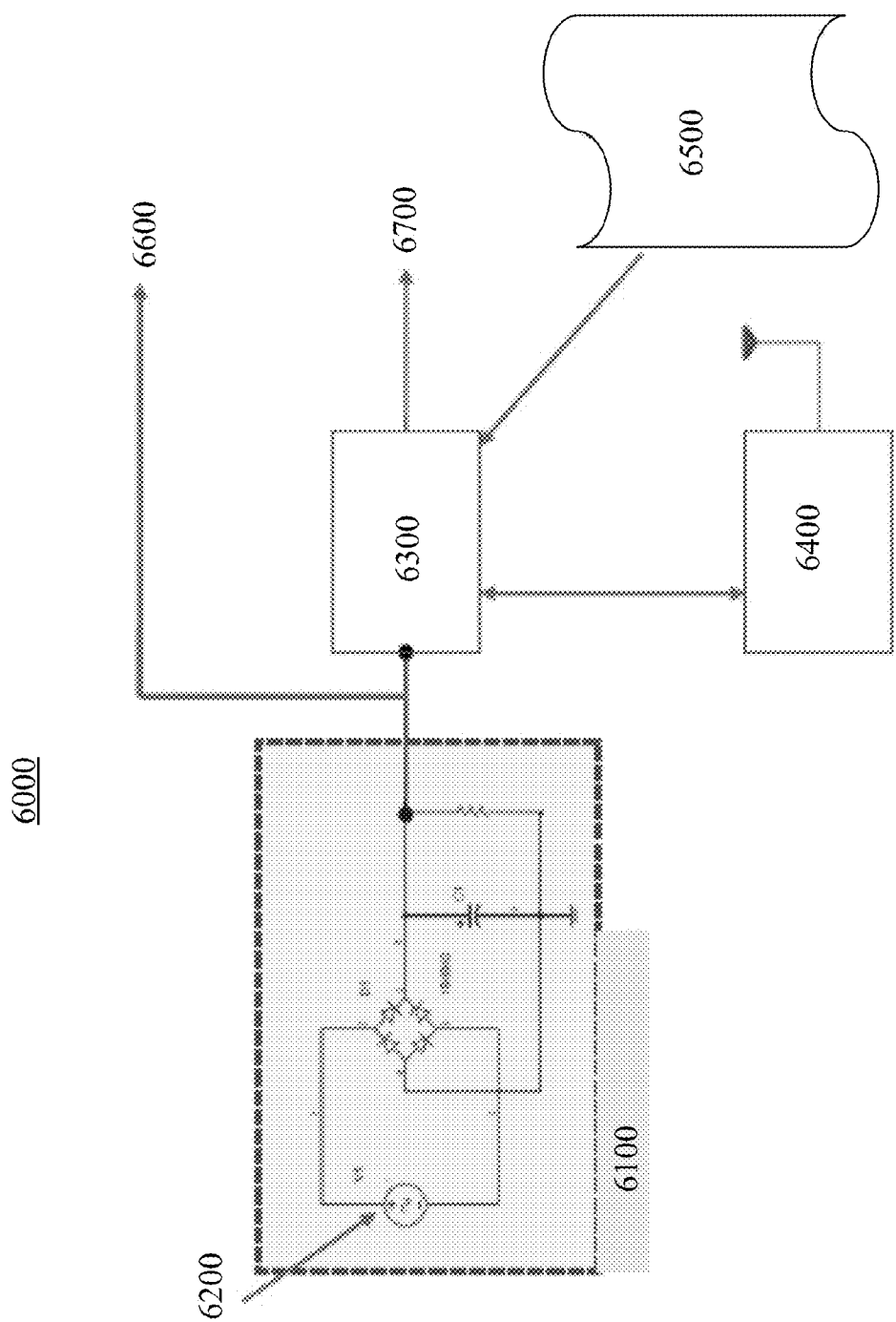
FIG. 6 is a block diagram of an exemplary embodiment of a wall mount multi point power charger system 6000.

FIG. 6 is a block diagram of an exemplary embodiment of a wall mount multi point power charger system 6000, which comprises an AC to DC power converter 6100 and a system controller 6300. AC to DC power converter 6100 receives electrical energy 6200, such as from a power circuit from a household wall outlet. Outputs from AC to DC power converter 6100 comprise a power flow 6600 to an RF processor and an input signal to system controller 6300. System controller 6300 operates via machine instructions 6500 (e.g., a program). System controller 6300 is communicatively coupled to a LAN 6400. System controller 6300 outputs a control signal 6700 to an RF and/or BB processor.

In certain exemplary embodiments, substantially untethered devices (e.g., electronic devices) determine a need for charging and requests charging via an AdHoc network. An information device coupled to the AdHoc network determines locations of each of the substantially untethered devices.

The information device coupled to the AdHoc network determines which device needs to be charging, where it is and which wall mounted multi point power charger will be directed to perform the charging. The selected wall multi point power charger generates a directed beam pointing toward a particular untethered unit and charging starts. Untethered unit locations are constantly being determined and/or updated by information device coupled to the AdHoc network. Each untethered unit monitors its own charging state, its location and communicates that charging state to the information device.

Figure 7:
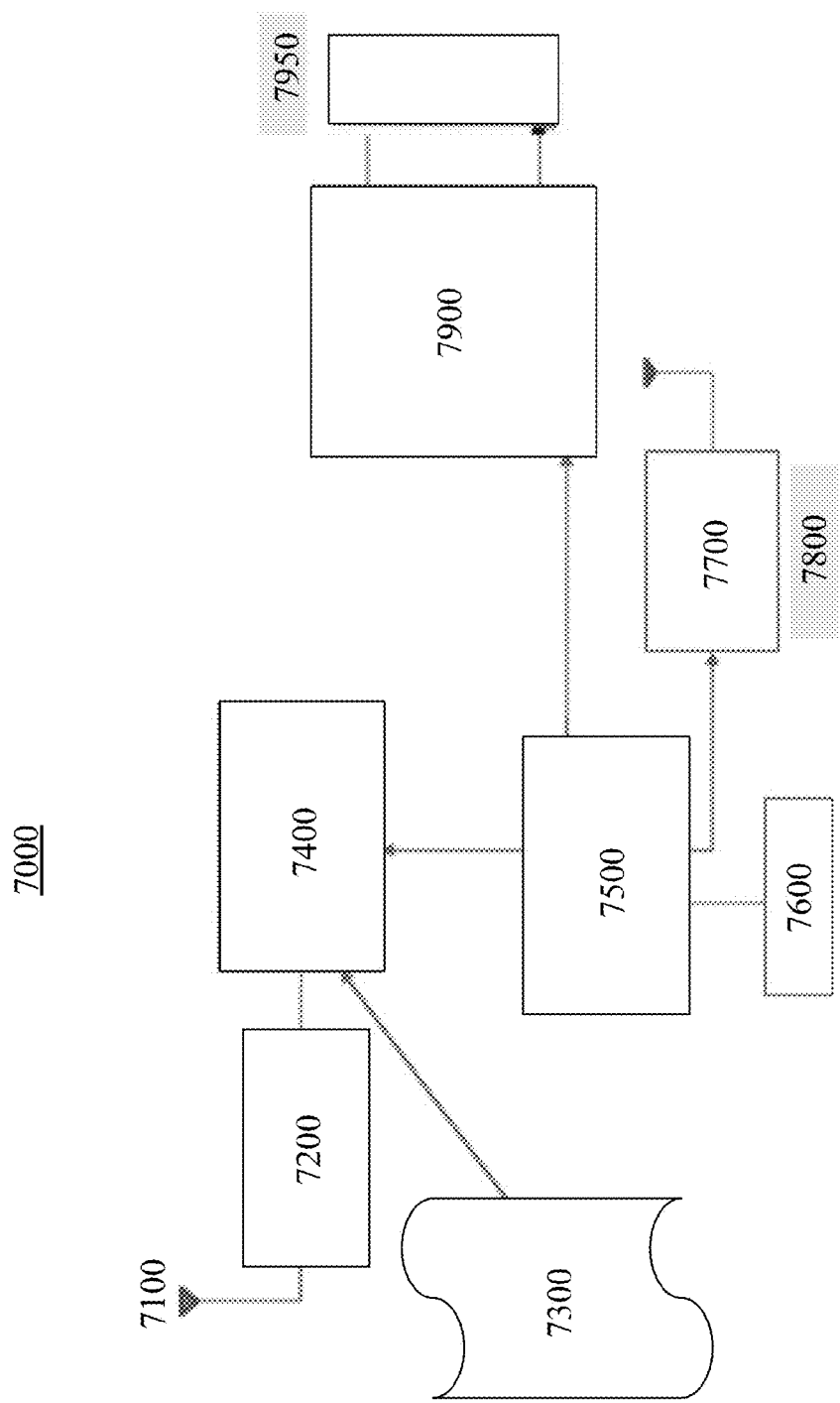
FIG. 7 is a block diagram of an exemplary embodiment of a system 7000.
Figure 8:
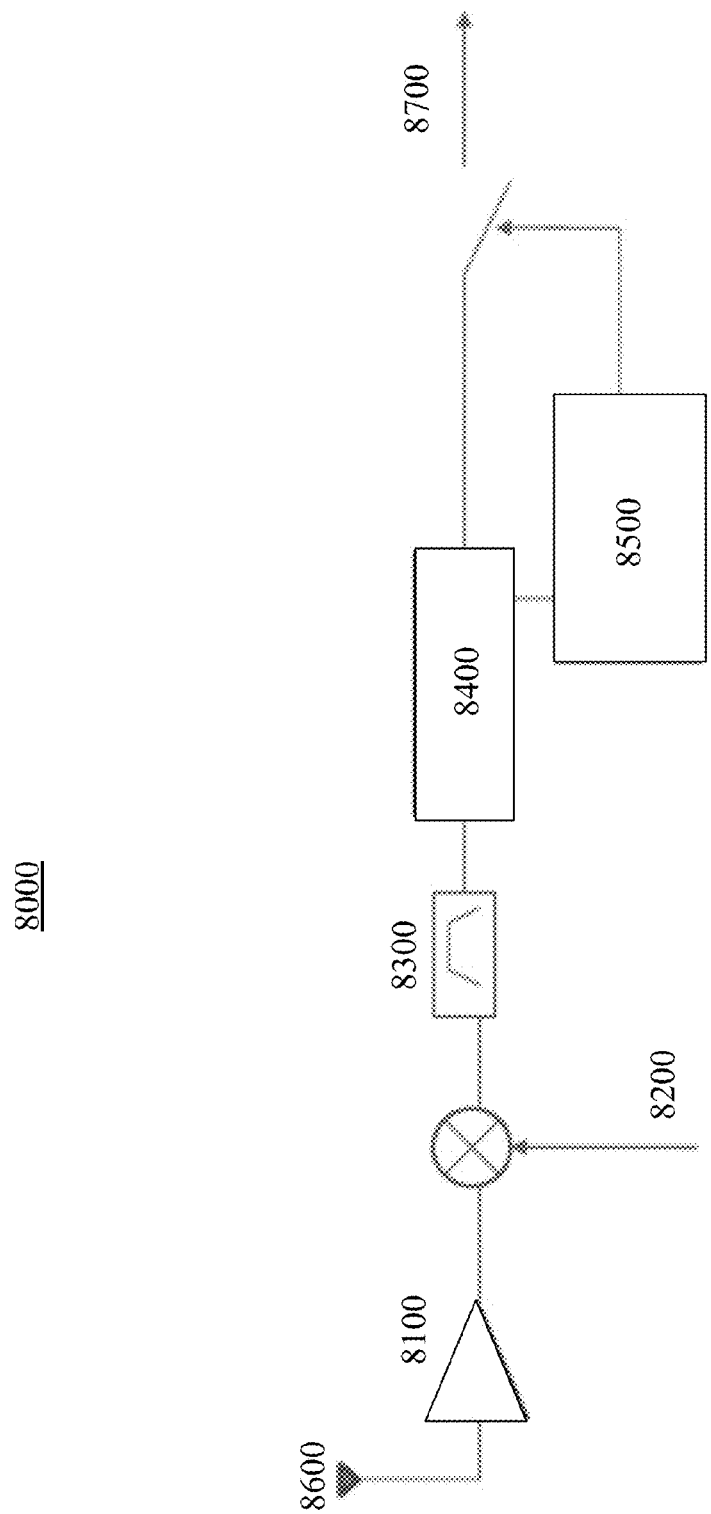
FIG. 8 is a block diagram of an exemplary embodiment of a mobile unit RF/BB processor system 8000.

FIG. 7 is a block diagram of an exemplary embodiment of a system 7000, which comprises an antenna 7100, an RF processor 7200, a baseband processor 7400, a controller 7500, an inertia measurement unit ("IMU") 7600, a baseband battery charging circuit 7900, and a battery 7950. Controller 7500 is communicatively coupled to a LAN 7700. LAN 7700 is communicatively coupled to a transmission channel 7800. Machine instructions 7300 are utilized by controller 7500 in processing signals that direct charging of battery 7950 via baseband battery charging circuit 7900. IMU 7600 assists in determining locations of devices communicatively coupled to controller 7500. Certain exemplary embodiments can be implemented as an Appliqué or as an integral part of the device that needs to be charged FIG. 8 is a block diagram of an exemplary embodiment of a mobile unit RF/BB processor system 8000, which comprises a low noise amplifier 8100, a local oscillator 8200, a band pass filter 8300, a demodulator 8400, and a processor 8500. Processor 8500 performs an RF destination calculation and causes an RF signal 8700 to a battery charger. An omnidirectional antenna 8600 receives RF energy, demodulates and determines the destination of a directional beam. If the directional beam is assigned to charge an electronic device, the DC electrical energy is available to charge a battery of the electronic device.

Figure 9:
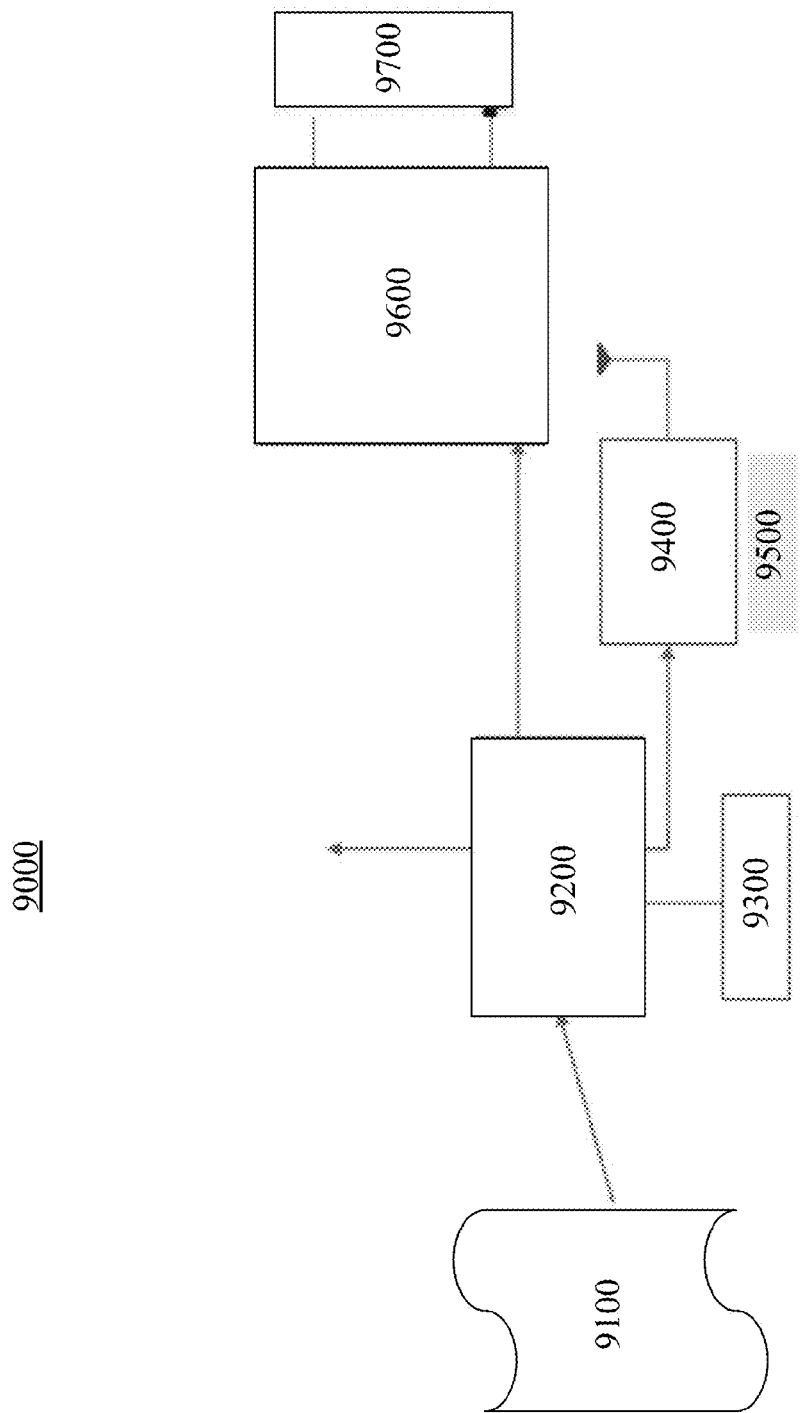
FIG. 9 is a block diagram of an exemplary embodiment of a system 9000.

FIG. 9 is a block diagram of an exemplary embodiment of a system 9000, which comprises a controller 9200, an IMU 9300, a baseband battery charging circuit 9600, and a battery 9700. Controller 9200 is communicatively coupled to a LAN 9400. LAN 9400 is communicatively coupled to a transmission channel 9500. Machine instructions 9100 are used by controller 9200 to facilitate charging of battery 9700.

Via Machine instructions 9100, controller 9200 determines if an electronic device comprising battery 9700 needs charging and issues a request via LAN 9400. LAN 9400 can be an AdHoc network. IMU 9300 provides a coarse (i.e., loosely approximated) location information that is transmitted collaboratively via the AdHoc network to determine a fine (i.e., more accurately approximated) location. In some embodiments, LAN 9400 can be coupled to an AdHoc network. When a beam is assigned to battery 9700, the charging of battery 9700 starts.

Figure 10:
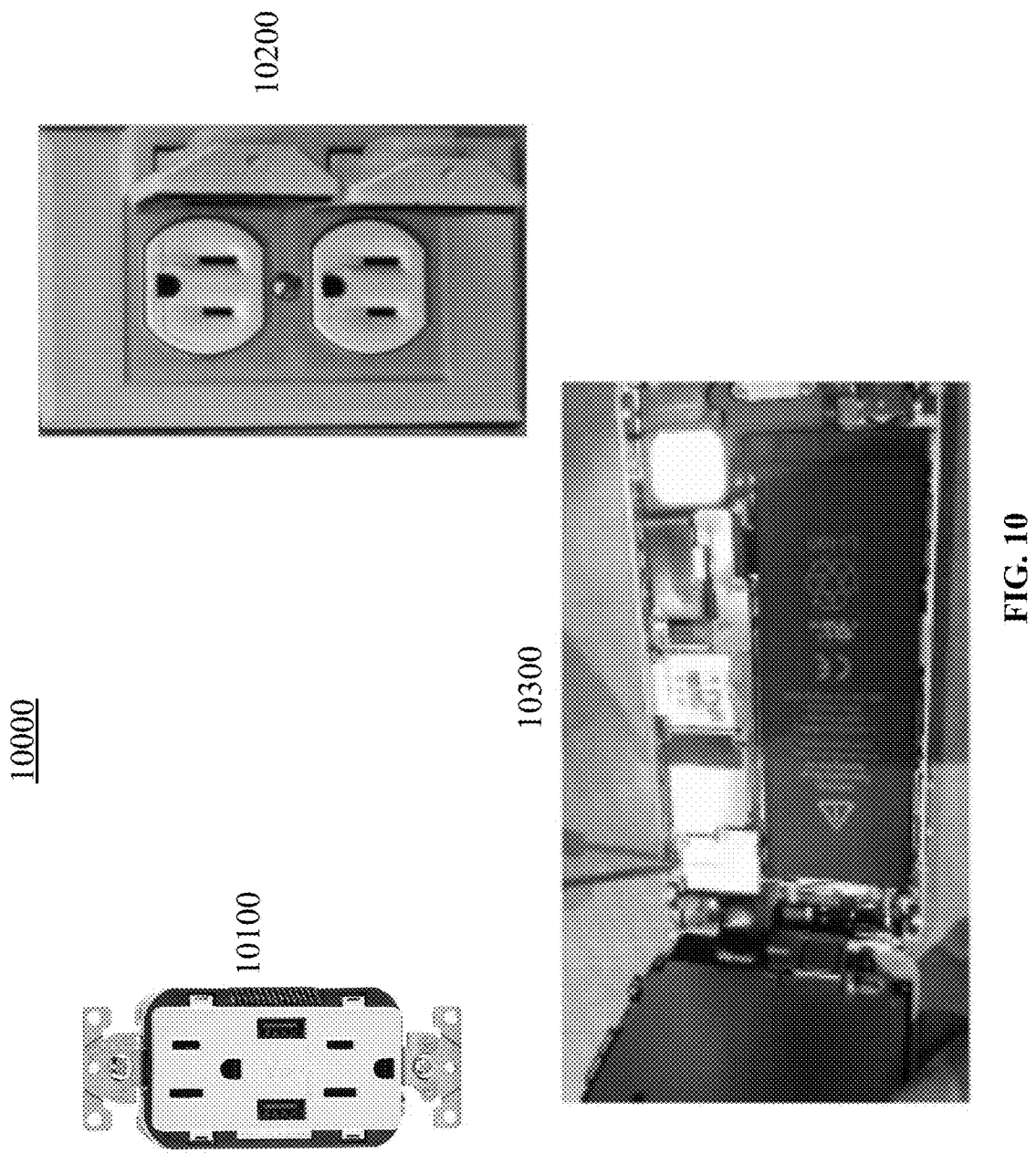
FIG. 10 comprises images 10000 of exemplary embodiments.

FIG. 10 comprises images 10000 of exemplary embodiments, which comprise an electrical receptacle 10100. A multi point power charger 10300 can be of a form to be directly coupled to electrical receptacle 10100. When so coupled, multi point power charger 10300 can cause electrical receptacle 10100 to have an appearance of installed multi point power charger 10200.

Figure 11:
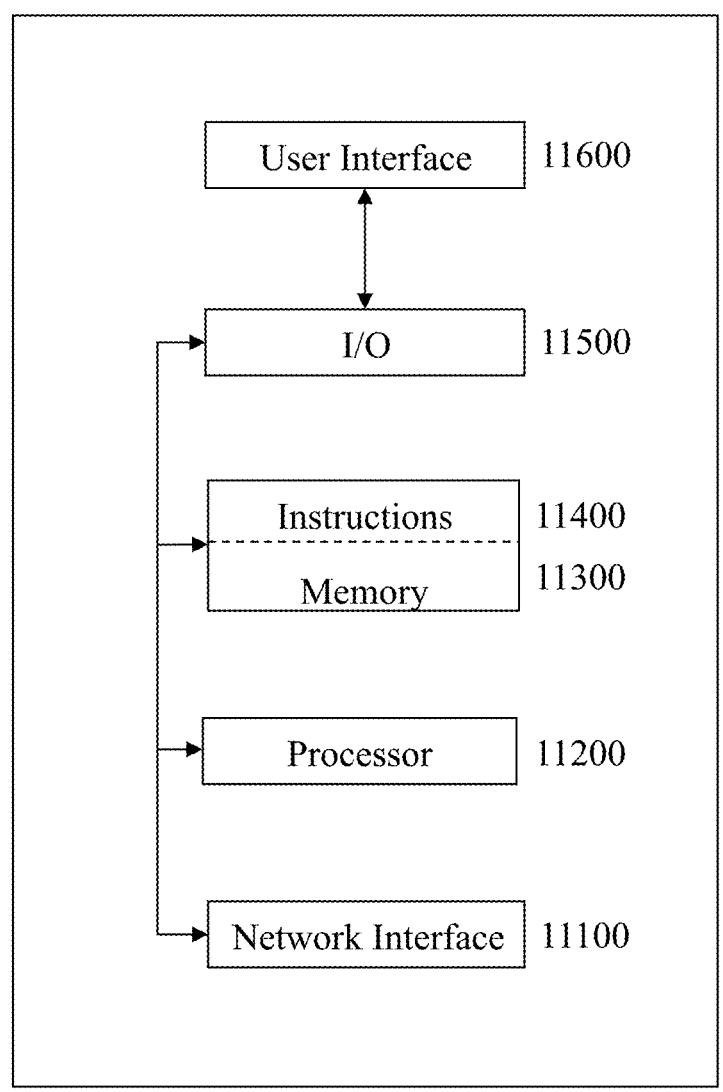
FIG. 11 is a block diagram of an exemplary embodiment of an information device 11000.

FIG. 11 is a block diagram of an exemplary embodiment of an information device 11000, which in certain operative embodiments can comprise, for example, the controller shown on page 6 of FIG. 1. Information device 11000 can comprise any of numerous circuits and/or components, such as for example, one or more network interfaces 11100, one or more processors 11200, one or more memories 11300 containing instructions 11400, one or more input/output (I/O) device 11500, and/or one or more user interfaces 11600 coupled to I/O device 11500, etc.

In certain exemplary embodiments, via one or more user interfaces 11600, such as a graphical user interface, a user can view a rendering of information related to charging and/or energizing devices via a charge controller. The user can also disable the charging and/or set the charging at certain times or power levels.

Figure 12:
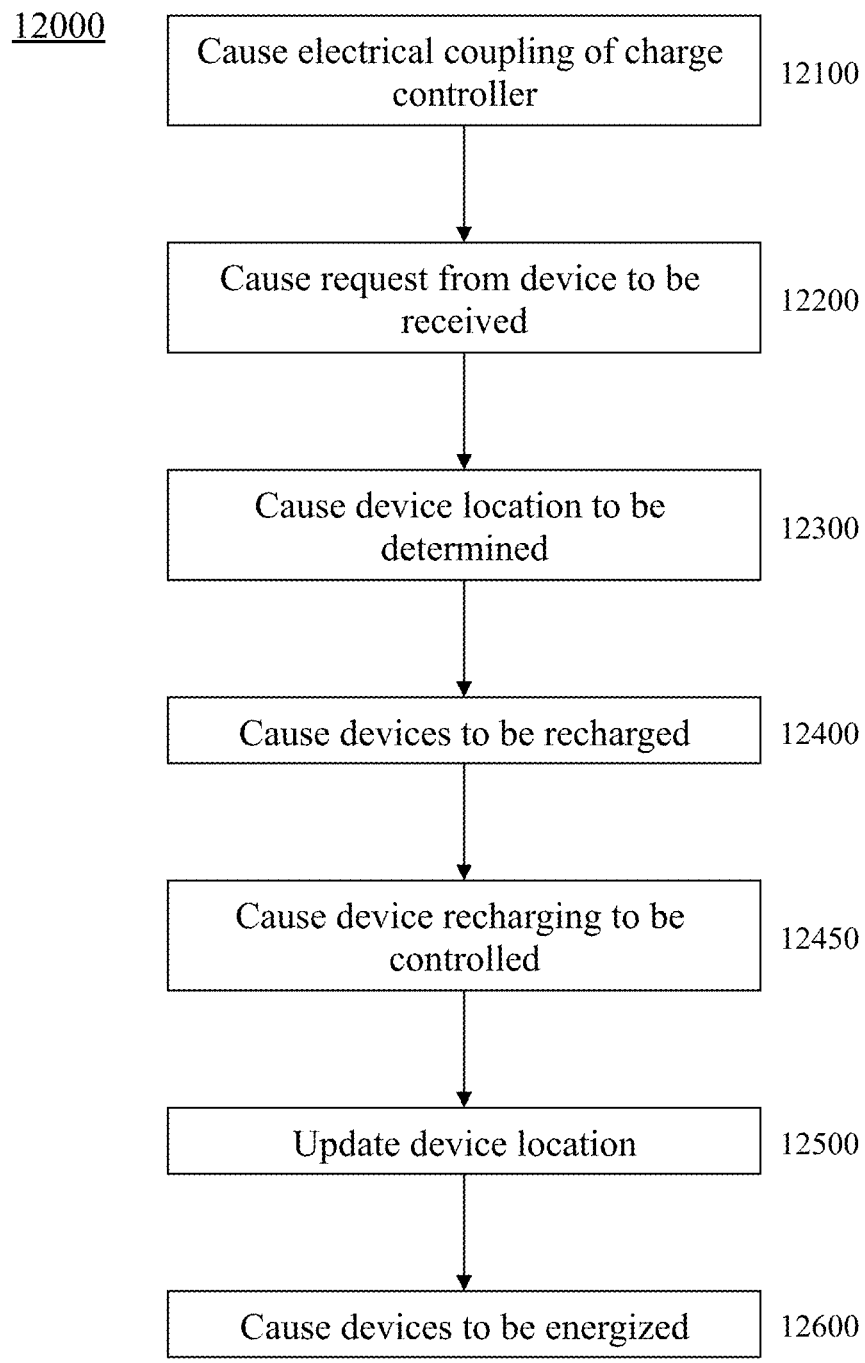
FIG. 12 is a flowchart of an exemplary embodiment of a method 12000.

FIG. 12 is a flowchart of an exemplary embodiment of a method 12000. At activity 12100, certain exemplary embodiments can cause a coupling of a charge controller to an electrical energy source (e.g., an electrical outlet, etc.). At activity 12200, certain exemplary embodiments can cause a request from a device to be received (e.g., a request to recharge a partially or nearly fully depleted battery). At activity 12300, certain exemplary embodiments can cause an electronic device to be located.

At activity 12400, certain exemplary embodiments can cause the electronic device to be charged via the charge controller. Certain exemplary embodiments comprise causing an electronic device to charge via a multi point power charger of a plurality of multi point power chargers. Certain exemplary embodiments comprise receiving a request to charge the electronic device. The multi point power charger is coupleable to the electrical energy source. The multi point power charger is constructed to direct a beam of electrical energy toward the electronic device. The multi point power charger can be selected from the plurality of multi point power chargers responsive to a first determination of a location of the electronic device and a second determination that a charging request has been received the electronic device. The beam of electrical energy is directed responsive to the determination of the location of the electronic device. The electronic device can be coupled to a local area network and the multi point power charger can also be coupled to the local area network. The local area network can comprise and/or be coupled to the electrical energy source. Radio frequency charging power can be dynamically controlled to provide low radiant power losses in the vicinity of devices to be charged. A charging element can selected based on an optimum power delivered to the electronic device to based at least one of:

a requested speed of charging; and/or
a level of charge of a battery comprised by the electronic device.

At activity 12450, certain exemplary embodiments cause device recharging to be controlled via the charge controller. At activity 12500, certain exemplary embodiments automatically update the location of the electronic device. At activity 12600, certain exemplary embodiments cause electrical devices to be energized via the charge controller.

Definitions

When the following terms are used substantively herein, the accompanying definitions apply. These terms and definitions are presented without prejudice, and, consistent with the application, the right to redefine these terms during the prosecution of this application or any application claiming priority hereto is reserved. For the purpose of interpreting a claim of any patent that claims priority hereto, each definition (or redefined term if an original definition was amended during the prosecution of that patent), functions as a clear and unambiguous disavowal of the subject matter outside of that definition.

a—at least one.
activity—an action, act, step, and/or process or portion thereof
AdHoc network—a network that forms substantially without prior preparation.
alternating current—an electric current that periodically reverses direction.
and/or—either in conjunction with or in alternative to.

apparatus—an appliance or device for a particular purpose associate—to join, connect together, and/or relate.

automatically—acting or operating in a manner essentially independent of external influence or control. For example, an automatic light switch can turn on upon "seeing" a person in its view, without the person manually operating the light switch.

base band processor—a portion of a multi point power charger that receives electrical energy via a direct current and outputs a plurality of direct current energy streams to a radio frequency processor.

beam—a ray of electromagnetic energy.

can—is capable of, in at least some embodiments.

cause—to produce an effect.

charge—to cause to store electrical energy such as in a battery.

charging beam—a ray of energy transmitted substantially along a line extending from a multi point power charger toward a determined location of an electronic device, which ray of energy has capacity to charge a battery of the electronic device.

circuit—an electrically conductive pathway and/or a communications connection established across two or more switching devices comprised by a network and between corresponding end systems connected to, but not comprised by the network.

comprising—including but not limited to.

configure—to make suitable or fit for a specific use or situation.

constructed to—made to and/or designed to.

convert—to transform, adapt, and/or change.

converter—a portion of a multi point power charger that receives alternating current electrical energy and outputs direct current electrical energy.

couple—to join, connect, and/or link together.

create—to bring into being.

data—distinct pieces of information, usually formatted in a special or predetermined way and/or organized to express concepts.

define—to establish the outline, form, or structure of detect—to discover an existence or presence of something.

determine—to obtain, calculate, decide, deduce, and/or ascertain.

device—a machine, manufacture, and/or collection thereof.

direct—to send substantially along a line to a determined location of an electronic device.

directable—capable of being sent substantially along a line to a determined location of an electronic device.

direct current—an electric current that flows substantially in a single direction.

direction—substantially along a line from a multi point power charger toward a determined location of an electronic device.

directional beam—a ray of energy transmitted substantially along a line extending from a multi point power charger toward a determined location of an electronic device.

dynamically—done in real time and without prior planning.

electrical energy—power absorbed or delivered via an electrical circuit.

electrical energy source—a power supply from a power generator.

electronic—a system constructed to process electrical signals.

electronic device—a device comprising circuitry with active semiconductors and/or passive elements. Electronic devices comprise televisions, DVD players, laptops, desktop computers, mobile phones, iPods, iPads, cameras, fans, ovens, washing machines, game consoles, printers and/or radios, etc.

emit—to send forth.

estimate—to calculate and/or determine approximately and/or tentatively.

follow—to track something that is in motion.

generate—to create, produce, give rise to, and/or bring into existence.

general location—an approximate estimate of a place occupied by something.

haptic—involving the human sense of kinesthetic movement and/or the human sense of touch. Among the many potential haptic experiences are numerous sensations, body-positional differences in sensations, and time-based changes in sensations that are perceived at least partially in non-visual, non-audible, and non-olfactory manners, including the experiences of tactile touch (being touched), active touch, grasping, pressure, friction, traction, slip, stretch, force, torque, impact, puncture, vibration, motion, acceleration, jerk, pulse, orientation, limb position, gravity, texture, gap, recess, viscosity, pain, itch, moisture, temperature, thermal conductivity, and thermal capacity.

illumination—an act of emitting light energy.

indicate—to be a sign of.

information device—any device capable of processing data and/or information, such as any general purpose and/or special purpose computer, such as a personal computer, workstation, server, minicomputer, mainframe, supercomputer, computer terminal, laptop, wearable computer, and/or Personal Digital Assistant (PDA), mobile terminal, Bluetooth device, communicator, "smart" phone (such as a Treo-like device), messaging service (e.g., Blackberry) receiver, pager, facsimile, cellular telephone, a traditional telephone, telephonic device, a programmed microprocessor or microcontroller and/or peripheral integrated circuit elements, an ASIC or other integrated circuit, a hardware electronic logic circuit such as a discrete element circuit, and/or a programmable logic device such as a PLD, PLA, FPGA, or PAL, or the like, etc. In general any device on which resides a finite state machine capable of implementing at least a portion of a method, structure, and/or or graphical user interface described herein may be used as an information device. An information device can comprise components such as one or more network interfaces, one or more processors, one or more memories containing instructions, and/or one or more input/output (I/O) devices, one or more user interfaces coupled to an I/O device, etc.

initialize—to prepare something for use and/or some future event.

input/output (I/O) device—any sensory-oriented input and/or output device, such as an audio, visual, haptic, olfactory, and/or taste-oriented device, including, for example, a monitor, display, projector, overhead display, keyboard, keypad, mouse, trackball, joystick, gamepad, wheel, touchpad, touch panel, pointing device, microphone, speaker, video camera, camera, scanner, printer, haptic device, vibrator, tactile simulator, and/or tactile pad, potentially including a port to which an I/O device can be attached or connected.

install—to connect or set in position and prepare for use.

light source—something that emits electromagnetic radiation within a portion of the electromagnetic spectrum that is visible to a human eye.

location—a place occupied by something.

loss—electrical energy that is environmentally dissipated.

machine instructions—directions adapted to cause a machine, such as an information device, to perform one or more particular activities, operations, or functions. The directions, which can sometimes form an entity called a "processor", "kernel", "operating system", "program", "application", "utility", "subroutine", "script", "macro", "file", "project", "module", "library", "class", and/or "object", etc., can be embodied as machine code, source code, object code, compiled code, assembled code, interpretable code, and/or executable code, etc., in hardware, firmware, and/or software.

machine readable medium—a physical structure from which a machine can obtain data and/or information. Examples include a memory, punch cards, etc.

may—is allowed and/or permitted to, in at least some embodiments.

memory device—an apparatus capable of storing analog or digital information, such as instructions and/or data. Examples include a non-volatile memory, volatile memory, Random Access Memory, RAM, Read Only Memory, ROM, flash memory, magnetic media, a hard disk, a floppy disk, a magnetic tape, an optical media, an optical disk, a compact disk, a CD, a digital versatile disk, a DVD, and/or a raid array, etc. The memory device can be coupled to a processor and/or can store instructions adapted to be executed by processor, such as according to an embodiment disclosed herein.

method—a process, procedure, and/or collection of related activities for accomplishing something.

minimize—reduce to a greatest extent possible.

motion—to relocate from a first location to a second location multi directional antenna array—a plurality of transducers arranged in a regular pattern that are constructed to directionally emit radio frequency spectrum electrical energy substantially wirelessly.

multi point power charger—a system that is constructed to provide substantially wireless electrical recharging energy to electronic devices.

network—a communicatively coupled plurality of nodes. A network can be and/or utilize any of a wide variety of sub-networks, such as a circuit switched, public-switched, packet switched, data, telephone, telecommunications, video distribution, cable, terrestrial, broadcast, satellite, broadband, corporate, global, national, regional, wide area, backbone, packet-switched TCP/IP, Fast Ethernet, Token Ring, public Internet, private, ATM, multi-domain, and/or multi-zone sub-network, one or more Internet service providers, and/or one or more information devices, such as a switch, router, and/or gateway not directly connected to a local area network, etc.

network interface—any device, system, or subsystem capable of coupling an information device to a network. For example, a network interface can be a telephone, cellular phone, cellular modem, telephone data modem, fax modem, wireless transceiver, Ethernet card, cable modem, digital subscriber line interface, bridge, hub, router, or other similar device.

optimum power—electrical energy in a quantity that provides approximately a best result for charging an electronic device.

packet—a discrete instance of communication.

plurality—the state of being plural and/or more than one.

power—to supply electrical energy in a sufficient quantity to operate something.

predetermined—established in advance.

probability—a quantitative representation of a likelihood of an occurrence.

processor—a device and/or set of machine-readable instructions for performing one or more predetermined tasks. A processor can comprise any one or a combination of hardware, firmware, and/or software. A processor can utilize mechanical, pneumatic, hydraulic, electrical, magnetic, optical, informational, chemical, and/or biological principles, signals, and/or inputs to perform the task(s). In certain embodiments, a processor can act upon information by manipulating, analyzing, modifying, converting, transmitting the information for use by an executable procedure and/or an information device, and/or routing the information to an output device. A processor can function as a central processing unit, local controller, remote controller, parallel controller, and/or distributed controller, etc. Unless stated otherwise, the processor can be a general-purpose device, such as a microcontroller and/or a microprocessor, such the Pentium IV series of microprocessor manufactured by the Intel Corporation of Santa Clara, Calif. In certain embodiments, the processor can be dedicated purpose device, such as an Application Specific Integrated Circuit (ASIC) or a Field Programmable Gate Array (FPGA) that has been designed to implement in its hardware and/or firmware at least a part of an embodiment disclosed herein.

project—to calculate, estimate, or predict.

provide—to furnish, supply, give, and/or make available.

radio frequency—is any of the electromagnetic wave frequencies that lie in the range extending from approximately 3 kHz to approximately 300 GHz, which include those frequencies used for communications or radar signals.

radio frequency processor—a portion of a multi point power charger that receives a plurality of direct current energy streams from a base band processor and outputs phase shifted direct current energy streams to an antenna array.

radiant power—electrical energy that is distributed via air.

range—an extent to which a directional beam can travel and still be capable of charging or powering an electronic device.

recharge—to restore an electrical potential to something via providing electrical energy.

real time—relating to systems that provide an absolute deterministic response to an event. Such a response is not based on average event time. Instead, in such systems, the deadlines are fixed and the system must guarantee a response within a fixed and well-defined time. Systems operating in real-time typically interact at a low level with physical hardware via embedded systems, and can suffer a critical failure if time constraints are violated. A classic example of a real-time system is the anti-lock brakes on a car. The real-time constraint, or deadline, in this system is the time in which the brakes must be released to prevent the wheel from locking. Another example is a car engine control system, in which a delayed control signal might cause engine failure or damage. Other examples of real-time systems include medical systems such as heart pacemakers and industrial process controllers.

receive—to get as a signal, take, acquire, and/or obtain.

recommend—to suggest, praise, commend, and/or endorse.

redirect—to change a direction of something.

reduce—diminish in magnitude.

render—to make perceptible to a human, for example as data, commands, text, graphics, audio, video, animation, and/or hyperlinks, etc., such as via any visual, audio, and/or haptic means, such as via a display, monitor, electric paper, ocular implant, cochlear implant, speaker, etc.

repeatedly—again and again; repetitively.

request—to express a desire for and/or ask for.

responsive—reacting to an influence and/or impetus.

select—to make a choice or selection from alternatives.

self-charge—to restore an electrical potential to something substantially without coupling to via one or more wires to electrical energy.

set—a related plurality.

signal—information, such as machine instructions for activities and/or one or more letters, words, characters, symbols, signal flags, visual displays, and/or special sounds, etc. having prearranged meaning, encoded as automatically detectable variations in a physical variable, such as a pneumatic, hydraulic, acoustic, fluidic, mechanical, electrical, magnetic, optical, chemical, and/or biological variable, such as power, energy, pressure, flowrate, viscosity, density, torque, impact, force, frequency, phase, voltage, current, resistance, magnetomotive force, magnetic field intensity, magnetic field flux, magnetic flux density, reluctance, permeability, index of refraction, optical wavelength, polarization, reflectance, transmittance, phase shift, concentration, and/or temperature, etc. Depending on the context, a signal and/or the information encoded therein can be synchronous, asynchronous, hard real-time, soft real-time, non-real time, continuously generated, continuously varying, analog, discretely generated, discretely varying, quantized, digital, broadcast, multicast, unicast, transmitted, conveyed, received, continuously measured, discretely measured, processed, encoded, encrypted, multiplexed, modulated, spread, de-spread, demodulated, detected, de-multiplexed, decrypted, and/or decoded, etc.

store—to place, hold, and/or retain data, typically in a memory.

substantially—to a great extent or degree.

system—a collection of mechanisms, devices, machines, articles of manufacture, processes, data, and/or instructions, the collection designed to perform one or more specific functions.

system controller—an information device that regulates electrical energy flow magnitudes and directions in a multi point power charger.

transmission—the broadcasting of electromagnetic waves from one location to another, as from a transmitter.

transmit—to send as a signal, provide, furnish, and/or supply.

update—to change based upon new or more accurate information.

user interface—any device for rendering information to a user and/or requesting information from the user. A user interface includes at least one of textual, graphical, audio, video, animation, and/or haptic elements. A textual element can be provided, for example, by a printer, monitor, display, projector, etc. A graphical element can be provided, for example, via a monitor, display, projector, and/or visual indication device, such as a light, flag, beacon, etc. An audio element can be provided, for example, via a speaker, microphone, and/or other sound generating and/or receiving device. A video element or animation element can be provided, for example, via a monitor, display, projector, and/or other visual device. A haptic element can be provided, for example, via a very low frequency speaker, vibrator, tactile stimulator, tactile pad, simulator, keyboard, keypad, mouse, trackball, joystick, gamepad, wheel, touchpad, touch panel, pointing device, and/or other haptic device, etc. A user interface can include one or more textual elements such as, for example, one or more letters, number, symbols, etc. A user interface can include one or more graphical elements such as, for example, an image, photograph, drawing, icon, window, title bar, panel, sheet, tab, drawer, matrix, table, form, calendar, outline view, frame, dialog box, static text, text box, list, pick list, pop-up list, pull-down list, menu, tool bar, dock, check box, radio button, hyperlink, browser, button, control, palette, preview panel, color wheel, dial, slider, scroll bar, cursor, status bar, stepper, and/or progress indicator, etc. A textual and/or graphical element can be used for selecting, programming, adjusting, changing, specifying, etc. an appearance, background color, background style, border style, border thickness, foreground color, font, font style, font size, alignment, line spacing, indent, maximum data length, validation, query, cursor type, pointer type, autosizing, position, and/or dimension, etc. A user interface can include one or more audio elements such as, for example, a volume control, pitch control, speed control, voice selector, and/or one or more elements for controlling audio play, speed, pause, fast forward, reverse, etc. A user interface can include one or more video elements such as, for example, elements controlling video play, speed, pause, fast forward, reverse, zoom-in, zoom-out, rotate, and/or tilt, etc. A user interface can include one or more animation elements such as, for example, elements controlling animation play, pause, fast forward, reverse, zoom-in, zoom-out, rotate, tilt, color, intensity, speed, frequency, appearance, etc. A user interface can include one or more haptic elements such as, for example, elements utilizing tactile stimulus, force, pressure, vibration, motion, displacement, temperature, etc.

vicinity—in a region in proximity to something.

via—by way of and/or utilizing.

update—to incorporate new or more accurate information in a database, program, and/or procedure.

weight—a value indicative of importance.

wireless—a transfer of information or power between two or more points that are not connected by an electrical conductor.

Note

Still other substantially and specifically practical and useful embodiments will become readily apparent to those skilled in this art from reading the above-recited and/or herein-included detailed description and/or drawings of certain exemplary embodiments. It should be understood that numerous variations, modifications, and additional embodiments are possible, and accordingly, all such variations, modifications, and embodiments are to be regarded as being within the scope of this application.

Thus, regardless of the content of any portion (e.g., title, field, background, summary, description, abstract, drawing figure, etc.) of this application, unless clearly specified to the contrary, such as via explicit definition, assertion, or argument, with respect to any claim, whether of this application and/or any claim of any application claiming priority hereto, and whether originally presented or otherwise:

there is no requirement for the inclusion of any particular described or illustrated characteristic, function, activity, or element, any particular sequence of activities, or any particular interrelationship of elements;

no characteristic, function, activity, or element is "essential";

any elements can be integrated, segregated, and/or duplicated;

any activity can be repeated, any activity can be performed by multiple entities, and/or any activity can be performed in multiple jurisdictions; and any activity or element can be specifically excluded, the sequence of activities can vary, and/or the interrelationship of elements can vary.

Moreover, when any number or range is described herein, unless clearly stated otherwise, that number or range is approximate. When any range is described herein, unless clearly stated otherwise, that range includes all values therein and all subranges therein. For example, if a range of 1 to 10 is described, that range includes all values therebetween, such as for example, 1.1, 2.5, 3.335, 5, 6.179, 8.9999, etc., and includes all subranges therebetween, such as for example, 1 to 3.65, 2.8 to 8.14, 1.93 to 9, etc.

When any claim element is followed by a drawing element number, that drawing element number is exemplary and non-limiting on claim scope. No claim of this application is intended to invoke paragraph six of 35 USC 112 unless the precise phrase "means for" is followed by a gerund.

Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such material is specifically not incorporated by reference herein.

Accordingly, every portion (e.g., title, field, background, summary, description, abstract, drawing figure, etc.) of this application, other than the claims themselves, is to be regarded as illustrative in nature, and not as restrictive, and the scope of subject matter protected by any patent that issues based on this application is defined only by the claims of that patent.

What is claimed is:

1. A system comprising:
  a multi point power charger, the multi point power charger coupleable to an electrical energy source, the multi point power charger constructed to emit a plurality of directional beams, wherein each of the plurality of directional beams is directable toward a determined direction of an electronic device, the multi point power charger constructed to wirelessly charge or power the electronic device,
  the multi point power charger comprising:
    a converter that is constructed to convert electrical energy having an alternating current or direct current into wireless electrical energy;
    a base band processor;
    a radio frequency processor, the radio frequency processor comprising a plurality of local oscillators, a plurality of band pass filters, a plurality of phase shifters, and a plurality of power amplifiers;
    a multidirectional antenna array, the multidirectional antenna array constructed to emit substantially wireless directional beams, wherein each substantially wireless directional beam flows to the antenna via one of the plurality of local oscillators, one of the plurality of band pass filters, one of the plurality of phase shifters, and one of the plurality of power amplifiers, the wireless directional beams:
      directed in any of a plurality of directions; and
      transmitted substantially wirelessly via a locally available radio frequency signal, radio frequency signal comprising a radio frequency charging beam; and
    a system controller constructed to:
      enable the electronic device to be followed by the radio frequency charging beam responsive to motion of the electronic device; and
      allow for a formation of an AdHoc network and repeatedly calculates a position of the electronic device so as to redirect the radio frequency charging beam; wherein:
  the electronic device requests charging;
  the multi point power charger is constructed to:
    determine a location of the electronic device;
    direct one of the plurality of directional beams toward the determined location of the electronic device to charge or power the electronic device;
    automatically update the location of the electronic device,
    redirect one of the plurality of directional beams toward the updated location of the electronic device; and
    provide a plurality of wireless electrical power radio frequency transmissions into a general location, wherein the electronic device is charged is in range within which the multi point power charger can cause a self-charge or recharge, and
  wherein a charging beam is selected based on an optimum power delivered to the electronic device based on requested speed of charging; and.

2. The system of claim 1, wherein:
  the multi point power charger is constructed to:
    determine the location of the electronic device;
    direct one of the plurality of directional beams toward the determined location of the electronic device to charge or power the electronic device; and
    provide the plurality of directional beams via radio frequency into the general location, whereby the electronic device is charged when in a range within which the multi point power charger can cause the self-charge or recharge.

3. The system of claim 1, wherein:
  the multi point power charger is constructed to provide the plurality of directional beams via radio frequency into the general location, whereby the electronic device is charged when in a range within which the multi point power charger can self-charge or recharge.

4. The system of claim 1, wherein:
  a signal is received by the multi point power charger indicating:
    that a charging request from the electronic device; and which of the plurality of directional beams will be providing electrical energy to the electronic device.

5. The system of claim 1, wherein:
the multi point power charger is one of a plurality of the multi point power chargers; and
a signal is received by the multi point power charger indicating:
   that a charging request from the electronic device; and
   which of the plurality of multi point power chargers will be providing electrical energy to the electronic device.

6. The system of claim 1, wherein:
the multi point power charger is constructed to provide electrical energy wirelessly to any detected device that requests electrical energy.

7. The system of claim 1, wherein:
the multi point power charger is one of a plurality of multi point chargers; and
the multi point power charger is dynamically selected from the plurality of multi point chargers based upon the determined location of the electronic device.

8. The system of claim 1, further comprising:
machine instructions that cause the electronic device to be charged via the multi point power charger.

9. A method comprising:
causing an electronic device to charge via a multi point power charger of a plurality of multi point power chargers, the multi point power charger coupleable to an electrical energy source, the multi point power charger constructed to direct a beam of electrical energy toward the electronic device, the multi point power charger comprising a radio frequency processor and an antenna, the radio frequency processor comprising a plurality of local oscillators, a plurality of band pass filters, a plurality of phase shifters, and a plurality of power amplifiers, wherein the beam of electrical energy flows to the antenna via one of the plurality of local oscillators, one of the plurality of band pass filters, one of the plurality of phase shifters, and one of the plurality of power amplifiers, the multi point power charger selected from the plurality of multi point power chargers responsive to a first determination of a location of the electronic device and a second determination that a charging request has been received the electronic device, the beam of electrical energy directed responsive to the determination of the location of the electronic device, wherein the electronic device requests charging, wherein: the multi point power charger is constructed to:
determine the location of the electronic device;
direct one of the plurality of directional beams toward the determined location of the electronic device to charge or power the electronic device;
automatically update the location of the electronic device,
redirect one of the plurality of directional beams toward the updated location of the electronic device; and
provide a plurality of wireless electrical power radio frequency transmission into a general location, wherein the electronic device is charged is in range within which the multi point power charger can cause a self-charge or recharge; and
wherein a charging element is selected based on an optimum power delivered to the electronic device to on requested speed of charging.

10. The method of claim 9, further comprising:
automatically updating the location of the electronic device.

11. The method of claim 9, further comprising:
receiving a request to charge the electronic device.

12. The method of claim 9, wherein:
the electronic device is coupled to a local area network and the multi point power charger is also coupled to the local area network; and
the local area network comprising the electrical energy source.

13. The method of claim 9, wherein:
radio frequency charging power is dynamically controlled to reduce losses in radiant power in the vicinity of devices to be charged.

14. The system of claim 1, further comprising:
the multi point power charger is of a form to be directly coupled to a household electrical receptacle.

15. The method of claim 9, wherein:
the multi point power charger is of a form to be directly coupled to a household electrical receptacle.

\* \* \* \* \*

UNITED STATES PATENT AND TRADEMARK OFFICE
CERTIFICATE OF CORRECTION

Page 1 of 2

PATENT NO. : 9,985,465 B1
APPLICATION NO. : 15/640574
DATED : May 29, 2018
INVENTOR(S) : Glover et al.

It is certified that error appears in the above-identified patent and that said Letters Patent is hereby corrected as shown below:

On the Title Page

Item (54), Column 1, in "Title", Line 2, after "MANAGING" insert -- WIRELESS --.

Item (71), Column 1, in "Applicants", Line 1, delete "Ahmad" and insert -- Dr. Ahmad --, therefor.

Item (72), Column 1, in "Inventors", Line 1, delete "Ahmad" and insert -- Dr. Ahmad --, therefor.

Item (56), Column 2, under "U.S. Patent Documents", Line 1, delete "3,887,739 A 6/1975 Kromrey" and insert -- 9,887,739 B2 2/2018 Leabman et al. --, therefor.

Item (56), Column 2, under "U.S. Patent Documents", Line 2, delete "5,114,834 A 5/1992 Nachshon" and insert -- 6,114,834 A 9/2000 Parise --, therefor.

Item (56), Column 2, under "U.S. Patent Documents", Line 4, delete "3,124,125 A1" and insert -- 9,124,125 B2 --, therefor.

In the Specification

In Column 1, Line 2, after "MANAGING" insert -- WIRELESS --.

In Column 1, Line 12, below "BRIEF DESCRIPTION OF THE DRAWINGS" insert -- FIGS. 1-10 are executed in color. --.

In Column 2, Line 38, after "located" insert -- ; --.

In Column 5, Line 17, after "charged" insert -- . --.

In Column 5, Line 37, delete "Machine" and insert -- machine --, therefor.

Signed and Sealed this
Thirteenth Day of April, 2021

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 9,985,465 B1

In Column 5, Line 57, delete "shown of page 6 of FIG. 1" and insert -- 6300 of FIG. 6 --, therefor.

In Column 6, Line 35, delete "to based" and insert -- based on --, therefor.

In Column 6, Line 62, after "thereof" insert -- . --.

In Column 7, Lines 1-2, after "purpose" insert -- . --.

In Column 7, Line 42, after "structure of" insert -- . --.

In Column 8, Line 48, after "general" insert -- , --.

In Column 9, Line 42, after "location" insert -- . --.

In the Claims

In Column 14, in Claim 1, Line 36, delete "device," and insert -- device; --, therefor.

In Column 14, in Claim 1, Line 43, delete "recharge," and insert -- recharge; --, therefor.

In Column 14, in Claim 1, Line 46, before "requested" insert -- a --.

In Column 14, in Claim 1, Line 46, delete "charging; and." and insert -- charging. --, therefor.

In Column 16, in Claim 9, Line 12, delete "device," and insert -- device; --, therefor.

In Column 16, in Claim 9, Line 16, delete "transmission" and insert -- transmissions --, therefor.

In Column 16, in Claim 9, Lines 21-22, delete "to on requested" and insert -- to based on a requested --, therefor.